(12) United States Patent
Jolly

(10) Patent No.: US 6,874,004 B2
(45) Date of Patent: Mar. 29, 2005

(54) METHOD AND SYSTEM FOR DETECTING CROSS LINKED FILES

(75) Inventor: Thomas Jolly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 10/135,298

(22) Filed: Apr. 30, 2002

(65) Prior Publication Data

US 2003/0204533 A1 Oct. 30, 2003

(51) Int. Cl.[7] .............................................. G06F 17/30
(52) U.S. Cl. ....................... 707/205; 707/100; 707/200; 711/100; 711/170; 711/200; 711/209; 713/100
(58) Field of Search ................................. 707/100, 200, 707/102, 10; 711/100, 170, 200, 209; 713/100

(56) References Cited

U.S. PATENT DOCUMENTS

| | | | | |
|---|---|---|---|---|
| 5,537,636 A | * | 7/1996 | Uchida et al. ............... | 707/200 |
| 5,579,516 A | * | 11/1996 | Van Maren et al. ............ | 707/1 |
| 5,623,651 A | * | 4/1997 | Jernigan, IV ................ | 707/206 |
| 5,668,970 A | * | 9/1997 | Cowart et al. ............... | 711/206 |
| 5,781,722 A | * | 7/1998 | Buches, Jr. ................... | 714/54 |
| 5,819,298 A | * | 10/1998 | Wong et al. ................. | 707/205 |
| 6,067,635 A | | 5/2000 | DeKoning et al. | |
| 6,247,128 B1 | * | 6/2001 | Fisher et al. ................. | 713/100 |
| 6,629,273 B1 | | 9/2003 | Patterson | |
| 6,647,479 B1 | * | 11/2003 | Laws ........................... | 711/170 |
| 6,735,678 B2 | * | 5/2004 | Noble et al. ................. | 711/165 |
| 2002/0048103 A1 | * | 4/2002 | Noble et al. .................... | 360/1 |
| 2002/0147733 A1 | * | 10/2002 | Gold et al. .................. | 707/200 |
| 2003/0106046 A1 | * | 6/2003 | Arnold et al. ............... | 717/129 |
| 2003/0182389 A1 | * | 9/2003 | Edwards ....................... | 709/213 |

OTHER PUBLICATIONS

Vernon J. Frazee, "MS–DOS v6.22 Help:CHKDSK," Jun. 14, 2000, http://www.comp–air.com/vfrazee/ms–dos/6.22/help/chkdsk.htm.

* cited by examiner

Primary Examiner—Jean M. Corrielus
Assistant Examiner—Chongshan Chen
(74) Attorney, Agent, or Firm—Leydig, Voit & Mayer, Ltd.

(57) ABSTRACT

A method for detecting and correcting cross-linked files while accessing data on a storage media. Each file includes control file information that defines a plurality of blocks on storage media allocated to the file. When a program identifies a volume of storage media that may include cross-linked files, the program intercepts requests to access a file on the storage device. The program then reads the control information for the file and identifies the blocks allocated to the file. The program compares the allocation to a free space map, identifying allocated and unallocated blocks on the storage media, and corrects any inconsistency between the free space map and the control information. The program also maintains a secondary map, which identifies the blocks on the storage media allocated to the files that have been previously been examined. If the program determines, based on the secondary map, a block on the storage media is allocated to at least a first file and a second file, the program modifies the allocation of the first file so that it does not reference a block allocated to the second file. The program is capable of correcting and detecting cross-linked files while the storage media is accessed by other programs such as applications.

23 Claims, 6 Drawing Sheets

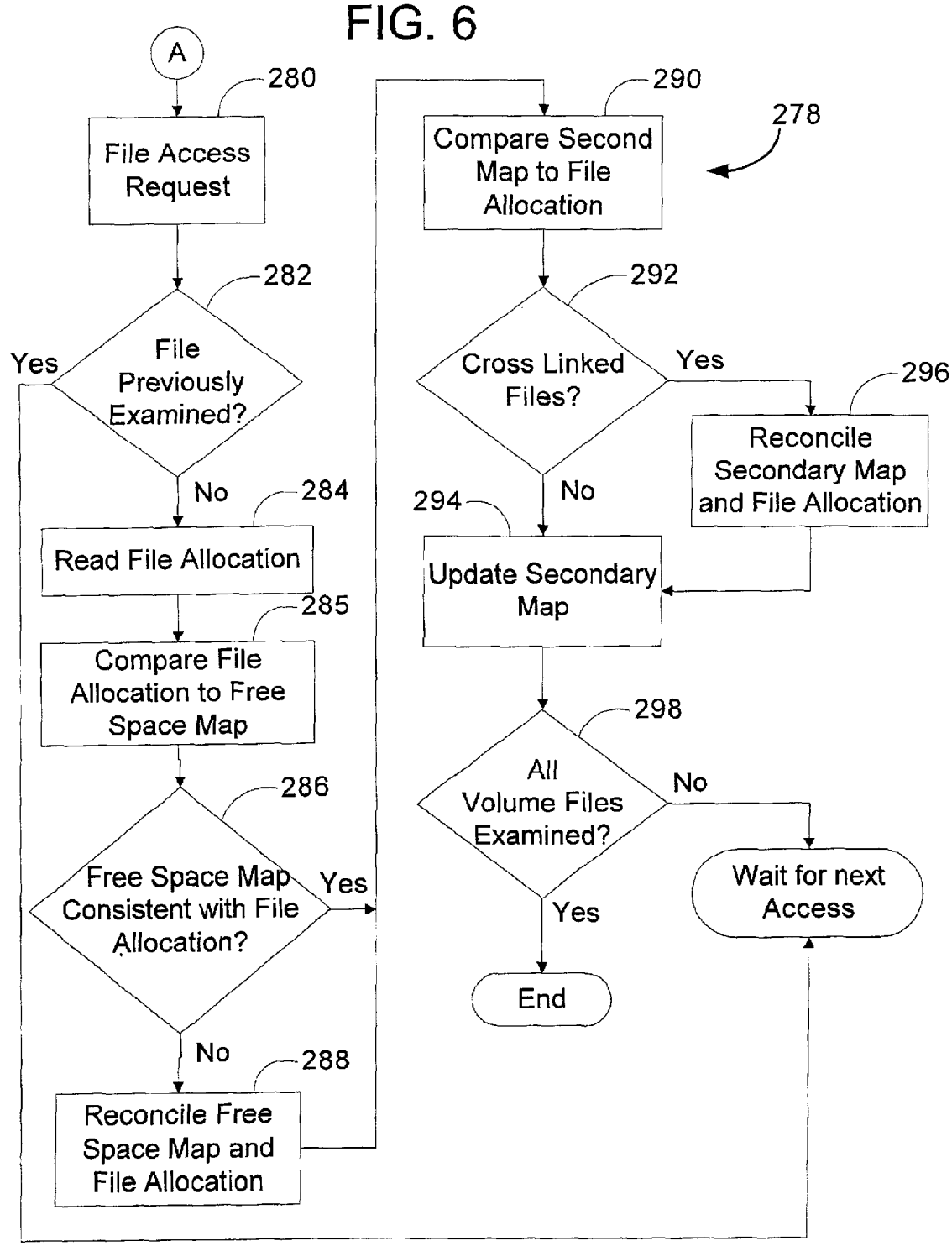

METHOD AND SYSTEM FOR DETECTING CROSS LINKED FILES

TECHNICAL FIELD

This invention relates generally to operating systems, and more particularly, relates to methods and systems that allow a file system to detect cross-linked files.

BACKGROUND OF THE INVENTION

Computers interface to one or more storage devices that incorporate removable or non-removable storage media. Examples of storage media include floppy disks, hard disks, CD ROMs, digital versatile disks (DVD) and the like. The storage media is used to store various types of information. For example, when a user creates a document with a word processing application program, the document can be saved as data on the storage media. A request is sent from the application program to an operating system executing in the computer. The operating system in turn sends a request to the storage device to store the data. The storage device then stores the data as part of a file on the storage media. The user can then later retrieve the data via the operating system, further manipulate the document, and resave the data as needed.

Data for the file is stored onto individual units on the storage media referred to as blocks or clusters. The storage media is organized so that the operating system can locate unallocated blocks (without stored data), to store new data and so that the operating system can locate and retrieve the data for the file. Thus, each file typically includes not only the data to be stored but also certain control information. For example, the control information identifies blocks on the storage media that include data for the file. The storage media also includes a free space map identifying blocks on the storage media that include stored data, i.e. allocated blocks; and blocks that are available to store new data, i.e. unallocated blocks.

To properly create a file, the operating system completes a series of transactions. The operating system reads the free space map to identify unallocated blocks on the storage media that can be used to store the data for the file. After a sufficient number of unallocated blocks are identified, the operating system sends a request to the storage device to store the data to the identified unallocated blocks. The operating system also updates the free space map on the storage media so that the blocks containing the file data are identified as allocated.

If the operating system fails to complete one or more of the transactions, the integrity of the storage media can become corrupted. Specifically, an inconsistency may occur between the free space map and the control information associated with one or more of the files on the storage media. For example, the operating system sends a request to the storage device to store the data associated with a first file along with its control information. However, the computer may crash or be shut off before the operating system updates the free space map. As a result, the free space map identifies one or more blocks, which include data for the first file, as unallocated. During a subsequent write operation for a second file, one or more of the blocks that include data for the first file are allocated to the second file because the blocks are identified in the free space map as unallocated. A loss of data can then occur when the data for the second file is stored on blocks allocated to both the first file and the second file. When one or more blocks are allocated to two or more files, the files are said to be "cross-linked."

The methods presently available to detect and correct cross-linked files are slow and inefficient. In known systems, a utility reads the data storage control information for all of the files on a storage media to identify cross-linked files. The amount of time required to read the control information for all of the files on the storage media can be on the order of many minutes or even hours depending on the media type, size and also the device speed. Data on the storage media cannot, for example, be accessed by other applications while the utility is executing. Because the storage media cannot be accessed while the utility is running, the methods presently available provide an inconvenient means to detect and correct cross-linked files.

SUMMARY OF THE INVENTION

In accordance with the foregoing, a method and system for detecting cross-linked files on a storage media is provided. The invention allows a file system to detect cross-linked files while data on the storage media is accessed.

In one embodiment of the invention, a program executing as part of the operating system enables a cross-link file detection function when a corrupted storage media volume is detected. The cross-link file detection function maintains a secondary map and an examined files data structure. The examined files data structure identifies the files previously examined by the cross-linked file detection function. The secondary map identifies blocks allocated to files that the cross-link file detection function has already examined.

When the cross-link file detection function is enabled, and the operating system requests access to file data on the storage media, the function reads the allocation of the file, i.e., an identification of blocks on the storage media including file data. The cross-link file detection function compares the allocation of the file with a free space map that identifies allocated and unallocated blocks on the storage media. If the primary map identifies, as unallocated, any blocks allocated to the file, the blocks allocated to the file are reconciled with the primary map.

The cross-link file detection function also compares the allocation of the file with the secondary map. If the secondary map identifies, as allocated, any blocks allocated to the file, the file is cross-linked with at least one other file on the storage media. The cross-link file detection function reconciles the allocation of the file with the secondary map.

In one embodiment of the invention, the cross-link file detection function reconciles the allocation of the file with the primary and secondary map by truncating the allocation of the file. The detection function removes, from the allocation of the file, any blocks that conflict with the primary or secondary map.

In an alternative embodiment of the invention, the cross-link file detection function reconciles the allocation of the file with the primary and secondary map by copying the data in blocks allocated to the file that conflict with the primary or secondary map to a new set of blocks on the storage media. The allocation of the file is modified to reference the new set of blocks.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together

FIG. 6 is a flow chart illustrating an example of the procedure that may be followed in an embodiment of the invention.

DETAILED DESCRIPTION OF THE INVENTION

Figure 1:
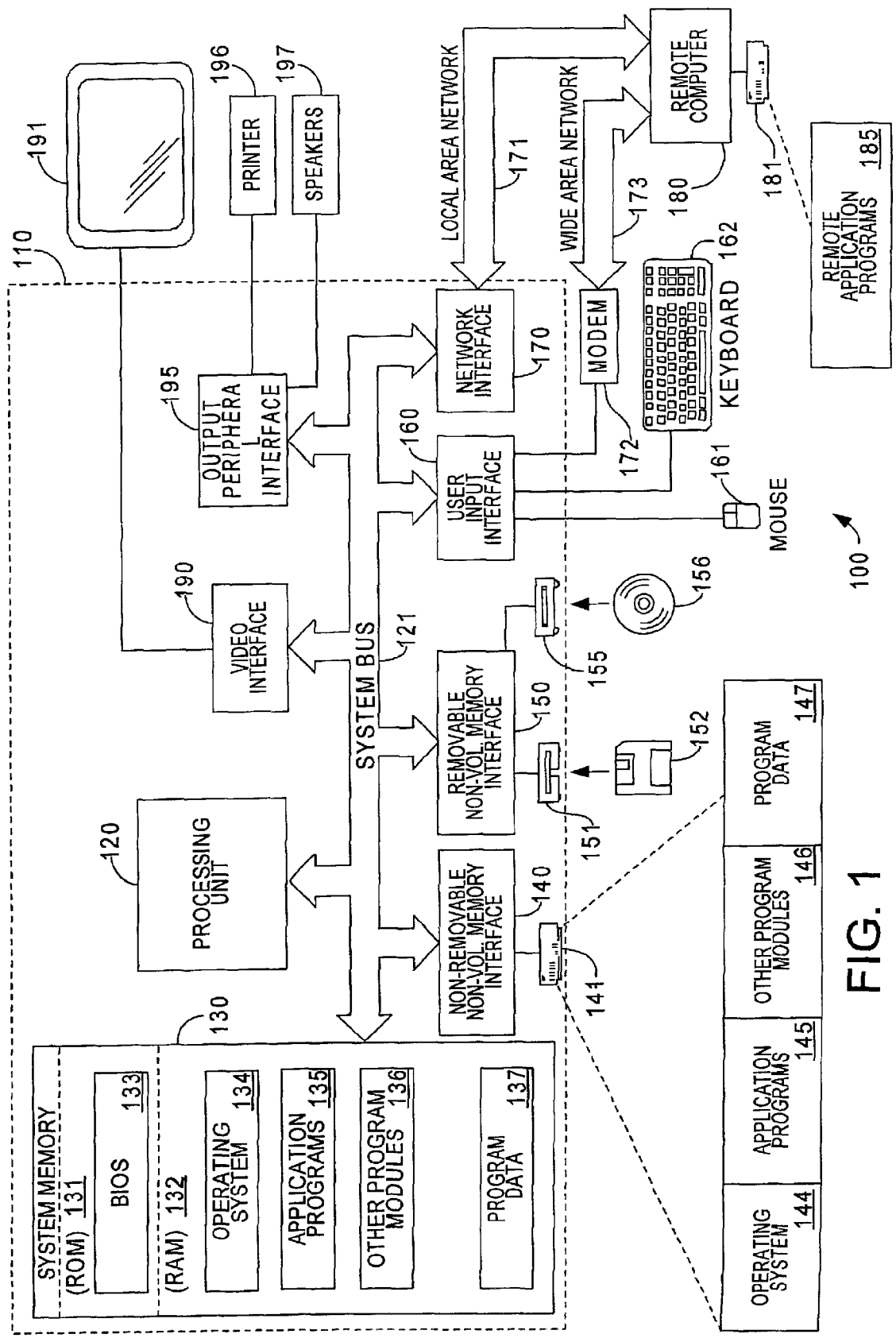
FIG. 1 is a block diagram generally illustrating an exemplary computer system on which the present invention resides.

The invention is generally directed to a method and system for detecting cross-linked files on a storage media divided into a plurality of blocks. A plurality of files are stored on the storage media. Each file includes data to be stored and control information identifying the blocks on the storage media that include data for the file, i.e., blocks that are allocated to the file. A free space map on the storage media identifies blocks on the media that include stored data, i.e. allocated blocks, and blocks that are available to store new data, i.e. unallocated blocks. When the control information for two or more files identify one or more common block, the files are cross-linked and one file may overwrite the data for another file.

In an embodiment of the invention, a secondary map is provided. The secondary map identifies the blocks on the storage media that are known to be allocated to other files. The program also maintains an examined files data structure. The examined files data structure allows the operating system to identify the files on the storage media that have been examined during a mount session. In an embodiment of the invention, files are only examined once per mount session.

A program intercepts requests to access data stored on the storage media. The program reads the control information for the file containing the data to be accessed and compares the blocks allocated to the file with a free space map. The program modifies the file's allocation to be consistent with free space map. The program also compares the file's allocation with the secondary map. The program further modifies the file's allocation to be consistent with the secondary map.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from-or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
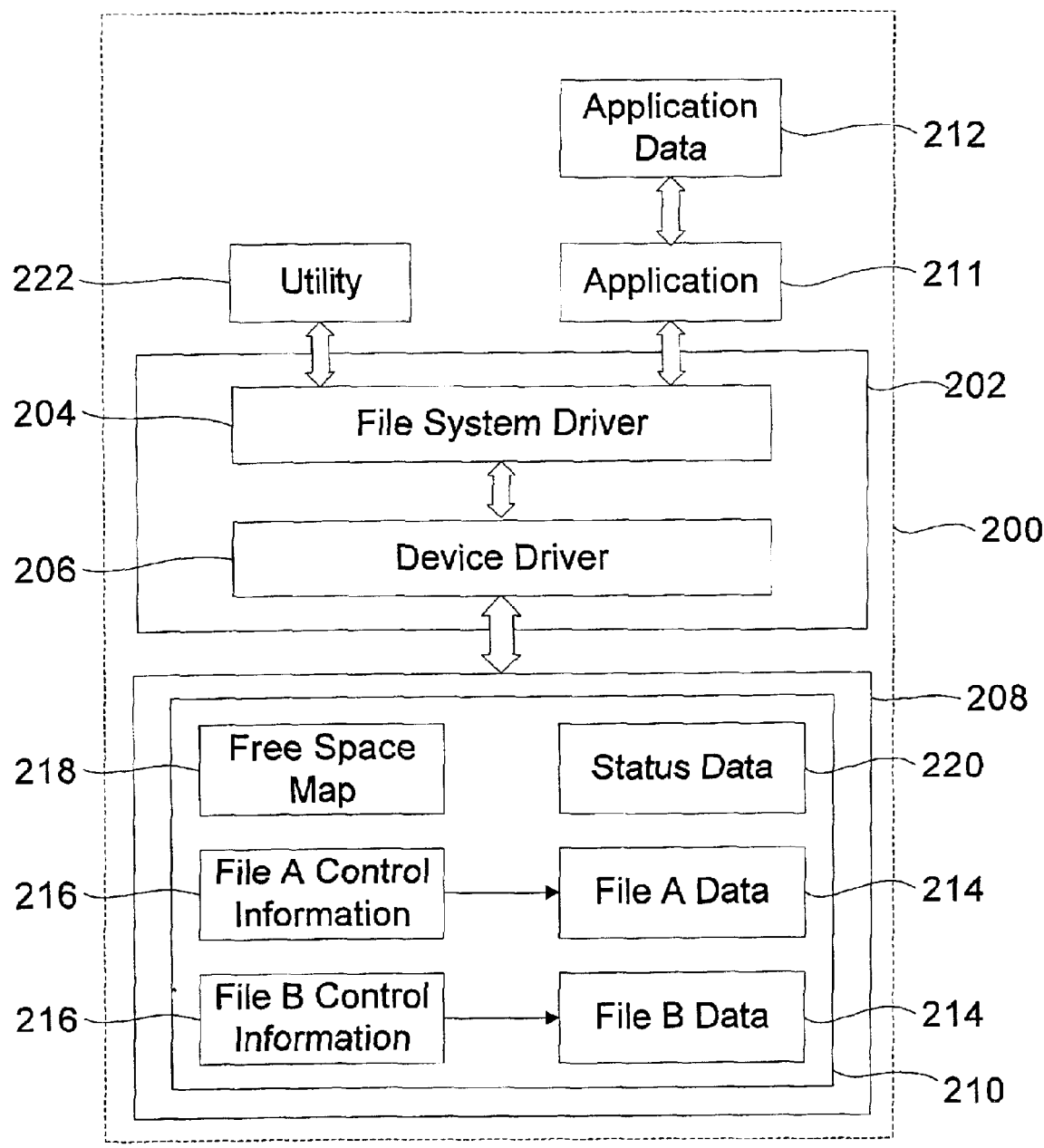
FIG. 2 is a block diagram of an operating environment that permits information to be stored on a storage media.

FIG. 2 illustrates an exemplary operating arrangement that allows information to be stored on storage media. The operating arrangement includes a computer 200. An operating system 202 executes within computer 200. The operating system 202 includes various components such as a file system driver 204 and a device driver 206 that facilitate communication between applications and utilities and a storage device 208. The storage device 208 further includes a storage media 210 capable of storing information such as, for example, computer readable instructions, data structures, program modules and other data processed within the computer 200.

By way of example, application 211, such as a word processing program, under direction from a user, creates application data 212, such as a document. The user requests the application 211 to save the document. To save the document, the application 211 passes a request to the operating system 202. The file system driver 204 and device driver 206 translate the request into an appropriate form and forward the request to the storage device 208. The storage device 208 stores the data from the document, such as text and formatting information, to a file on the storage media 210.

Exemplary types of the storage devices 208 include hard disk drives, floppy disk drives, DVD disk drives, CD ROM drives and the like. Potential forms of the storage media 210 include both removable and non-removable media. For example, a DVD disk is a type of removable media that is inserted into or removed from a DVD disk drive storage device. A fixed hard disk is a type of non-removable media that is included as part of a fixed hard disk drive. The storage media 210 is divided into one or more volumes. A volume corresponds to a logical partition on the storage media. For example, a floppy disk may include a single partition or volume while a hard disk may include a plurality of partitions or volumes. The exemplary storage media 208 shown in FIG. 2 comprises a single volume.

The storage media 210 is further divided into a plurality of units referred to as blocks and each block stores a certain amount of data. In the example shown, the storage media 210 includes file data 214, control information 216, a free space map 218 and status data 220. The file data 214, control information 216, free space map 218 and status data 220 are stored on the plurality of blocks on the storage media 210.

The file data 214 comprises the data to be stored for a file. For example, in the case of word processing document, the file data 214 includes the text and formatting information for the document. In the case of a program, such as an application 211, the file data 214 includes a set of computer executable instructions. As those skilled in the art will recognize, file data 214 may comprise part of a file object, data stream or similar structure. However, for simplicity, file data 214 is referred to herein as simply comprising part of a file.

As generally shown, each set of file data 214 includes corresponding control information 216. The control information 216 identifies which blocks on the storage media 210 include the file data 214, i.e. which blocks on the storage media are allocated to the file. For example, the data for a word processing document may require 50 blocks of storage media space. The control information 216 identifies which 50 blocks on the storage media include the word processing document file data 214. The control information 216 also includes other information, such as the date and time the file was created and the file size. The operating system 202 reads the control information 216 to locate the blocks that store data 214 for a particular file.

The free space map 218 identifies blocks on the storage media that are allocated and blocks that remain unallocated. An allocated block contains stored data. For example, allocated blocks include blocks containing file data 214 for at least one file, control information 216, status data 220, or the free space map 218. The free space map 218 is implemented in any suitable manner. By way of example, the free space map is a bitmap where each bit corresponds to one of the plurality of blocks that exist on the storage media 210. A bit with a value of "1" indicates an allocated block while a value of "0" indicates an allocated block.

The status data 220 provides information concerning a current state of the storage media 210. For example, the status data 220 identifies whether the disk is "open" or "closed." The function of the status data 220 is described in further detail below.

The method of implementing stored data, such as file data 214, status data 220, control information 216, and the free space map 218 depends on file system types. Examples of file system types include New Technology File System (NTFS), File Allocation Table (FAT) and Universal Disk Format (UDF) to name a few. Such file systems are known and need not be described in detail. Of course, as will become apparent, the invention is not limited to any particular file system type.

To store data 214 for a file on the storage media 210, the operating system completes a plurality of transactions. For example, the operating system 202 reads the free space map 218 to identify enough unallocated blocks on the storage media 210 to store the file data 214 and its corresponding control information 216. The operating system 202 then sends a request to the storage device 208 to store the file data 214 and the control information 216. The operating system also updates the free space map 218 to identify blocks containing the file data 214 and control information 216 as allocated.

The operating system 202 updates the status data 218 on the storage media 210 while performing the transactions. For example, before the operating system requests storage of the file data 214 and control information 216 on the storage media 208 the operating system 202 updates the status data 218 to indicate that the storage media 210 volume is open. After the operating system 202 completes all necessary transactions to store the data on the storage media 210, including updating the free space map 218, the status data 220 is changed to indicate that the storage media is closed.

If the operating system 202 fails to complete all required transactions when storing data to a file, the storage media 208 can become corrupted. For example, the control information 216 for one or more of the sets of file data 214 becomes inconsistent with the free space map 218. As a result, the control information 216 for a plurality of files identifies one or more common block. As a specific example, the operating system 202 sends a request to the storage device 208 to store the file data 214 and the control information 216 for a first file, but because of a system error or power down sequence, the operating system 202 fails to update free space map 218 even though the first file, itself designates blocks as allocated. The operating system 202 subsequently reads the free space map 218 and identifies one or more blocks as unallocated even though the one or more blocks include data for the first file. As a result, the operating system 202 allocates one or more of the blocks containing data for the first file to a second file thereby creating cross-linked files. File data for the second file may overwrite the file data of the first file and vice versa causing a loss of data for at least one file.

Figure 3:
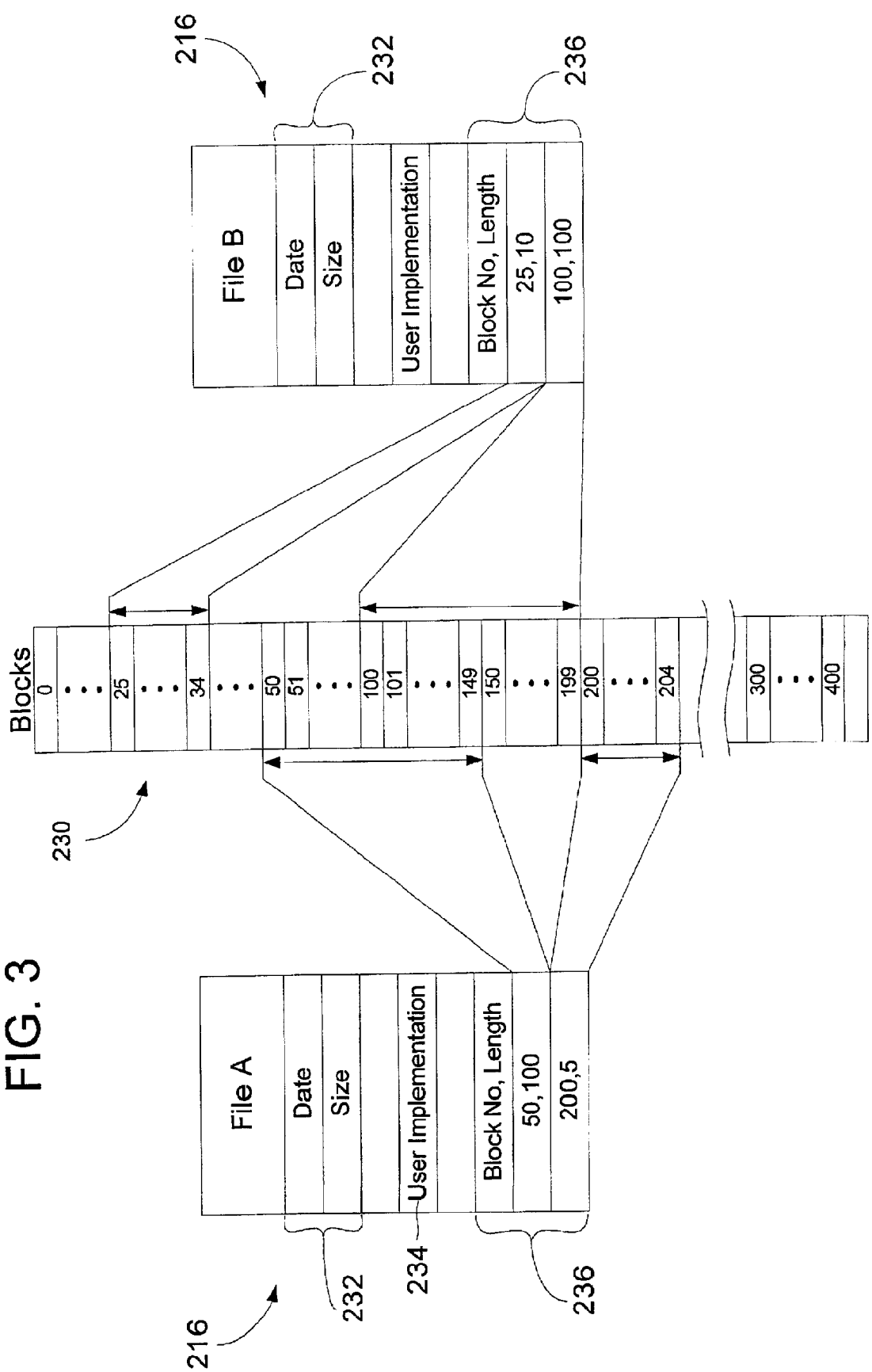
FIG. 3 is a block diagram illustrating cross-linked files.

FIG. 3 illustrates an example of two cross-linked files, FILE A and FILE B. Each file includes control information 216 identifying data blocks 230 within a set of allocated data blocks. The blocks on the storage media are sequentially numbered to represent the offset from the beginning of the storage media volume.

As previously described, the control information 216 for each file includes file attributes 232, such as the date the file was created and the file size. The control information 216 also includes other data such as user implementation data 234. The control information 216 further includes information 236 identifying the blocks allocated to the file. In the example shown, the blocks allocated to the file are identified by one or more entries including a block number and a length. The block number identifies a starting block referenced from the beginning of storage media volume. The length identifies the total number of contiguous blocks, including the starting block, that include data for the file.

In the example shown, FILE A includes data starting at block 50 with a length of 100 blocks. Thus, FILE A purportedly includes data within blocks 50 through 149. FILE A also includes data starting at block 200 with a length of 5 blocks, i.e. includes data at blocks 200 through 204. The control information for FILE B indicates that it includes data at blocks 25 through 34 and blocks 100 through 199. As shown in FIG. 3, both FILE A and FILE B claim blocks 100–149, thus indicating cross-linking of FILE A and FILE B.

Returning to FIG. 2, when a volume of the storage media 210 is first accessed, for example, after the computer is turned on or after a new storage media 210 is inserted into the storage device 208, the operating system 202 reads the status data 218. If the status data 218 indicates that the disk is open, previous write transactions may not have been completed and the storage media 210 may include an inaccurate free space map 218, cross-linked files or both. The operating system 202 notifies the user that the files on the storage media 210 may be corrupted.

Thereafter, the user elects to run a utility 222 that attempts to identify and resolve cross-linked files on the storage media 210. The utility 222 reads the control information 216 for all of the files stored on the storage media 210 to determine whether any block on the storage media is allocated to more than one file. However, while the utility 222 is checking the storage media 208 for cross-linked files, other programs, such as application 211 cannot access the storage media 204. Thus, when such known utilities are running, the computer 200 is generally unavailable to a user.

Figure 4:
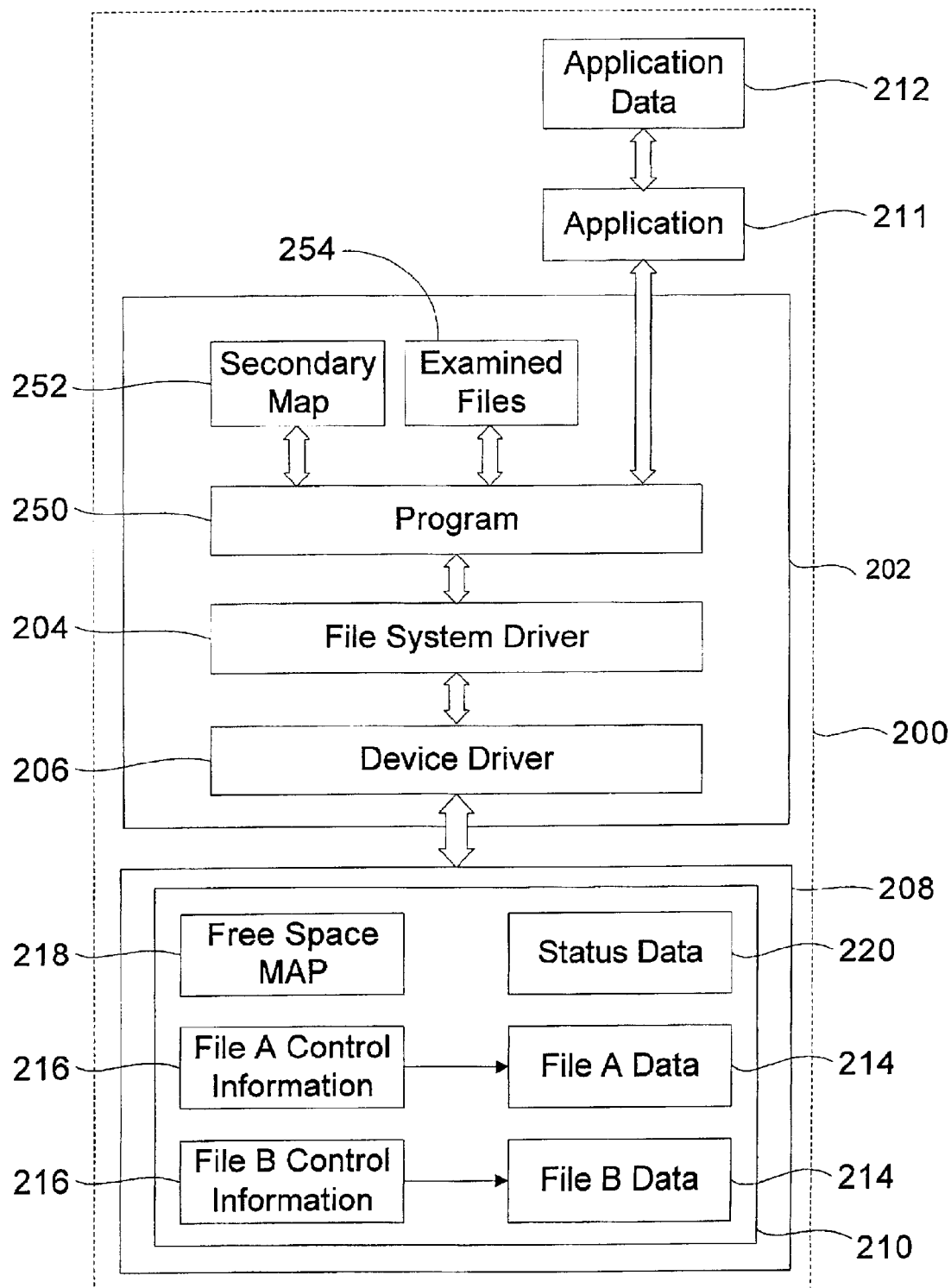
FIG. 4 is a block diagram illustrating an example of an operating environment in which the present invention may be employed.

An example of the operating environment in which the present invention is utilized is depicted in FIG. 4. Unlike the environment shown in FIG. 2, the operating system 202 includes a program 250 that facilitates detecting and correcting cross-linked files while, for example, application 211, through the operating system 202, accesses storage media 210, e.g. sends a request to the storage device 208 to read data from or write data to the storage media 210.

The program 250 maintains a secondary map 252 and examined file data 254 to facilitate the detection of cross-linked files. In an embodiment of the invention, the cross-linked file detection function only examines each file on the volume one time during a mount session. The examined files data 254 identifies files on the storage media 210 volume examined by the program 250 during a mount session. A mount session is the time during which the storage media 210 is accessible for read and write operations. For example, for a fixed hard disk, the mount session is the period of time that the computer is turned on. For removable media, such as a DVD disk, the mount session is the time during which the media is inserted into the storage device 208.

During the mount session, the program 250 intercepts requests to access the storage media 210 from, for example, the application 211. When the storage media 210 is first accessed during the mount session, the program 250 reads the status data 220. If the status data 220 indicates that the storage media 210 is closed, the storage media 210 is accessed as previously described with reference to FIG. 2. If, however, the status data 210 indicates that the storage media is open, one or more write transactions may not have been successfully completed with that volume and the storage media 210 may be corrupted. As a result, the program 250 enables a cross-linked file detection function.

When the cross-linked file detection function is enabled, and a file on the storage media 210 is accessed for the first time during the mount session, the program 250 reads the control information 216 to identify blocks on the storage media allocated to the file.

The program 250 then compares the blocks allocated to the file with the free space map 218. If the control information 216 identifies any blocks allocated to the file that are identified as unallocated in the free space map 218, the program 250 reconciles the free space map 218 and the control information 216 so that the control information 216 only identifies, as allocated to the file, blocks that are identified as allocated in the free space map 218.

The secondary map 252 identifies blocks that that are allocated to any file on the volume that the program 250 has previously examined during the current mount session. The program 250 compares the allocation of the file, as reconciled with the free space map 218, with the secondary map 252. If any blocks allocated to the file are also identified as allocated in the secondary map, the file is cross-linked with at least one other file on the storage media 210. The program 250 then further reconciles the control information 216 and the secondary map 252 so that the control information 216 does not identify any blocks, as allocated to the file, if those blocks are also identified by the secondary map 252 as allocated to another file. After the secondary map 252 and control information 216 for the file being examined are reconciled, as necessary, the secondary map 252 is updated. Specifically, any blocks identified in the control information 216 as being allocated to the file are set in the secondary map 252 as allocated.

After the control information 216 for the file is reconciled with the free space map 218 and the secondary map 252, the program 250 updates the examined file data 254. Specifically, the examined file data 254 is updated to indicate that the file has been examined.

It will be understood by those skilled in the art that, although the invention is shown as implemented in a single computer, the invention may be implemented in a computer network environment. For example, the program 250 may reside on a server and be used to detect cross-linked files on storage media 210 accessible by a client computer. It will further be understood that, although the secondary map 252 and examined file data 254 are illustratively shown as memory accessible by the operating system 202, the secondary map 252 and examined objects data 224 may be stored in non-volatile memory, such as data on the storage media 210.

The program 250 is, by way of example, implemented as any set of computer executable instructions. Although shown as part of the operating system 202, the program 250 is alternatively implemented outside of the operating system. For example, the program 252 is implemented as an application 211. The program 250 is also potentially implemented as a part of the file system driver 204.

The secondary map 252 is implemented in any of a number of suitable ways. For example, the secondary map 252 is implemented as a bitmap. In the case of a bitmap, the secondary map 252 comprises a plurality of bits and each bit corresponds to a block on the storage media. A bit with a value of 1 in a particular bitmap portion means that the corresponding block is allocated to at least one file. A value of 0 means that the program 250 has not examined the control information 216, since commencing the current mount session, for any file that identifies that block as allocated.

Alternatively, the secondary map 252 may is implemented as an extent list as shown in Table 1 below.

TABLE 1

| Starting Block | Length |
|---|---|
| 100 | 50 |
| 200 | 25 |

In the example shown in Table 1, the extent list includes a series of entries. Each entry includes a "Starting Block" and a "Length" corresponding to a set of contiguous blocks identified as allocated to a file examined by the program 250. For example, the first entry identifies a set of 50 contiguous blocks, beginning with block 100. Thus, the program 250 has examined a file with a block allocation including blocks 100–149. The second entry identifies a set of 25 contiguous blocks beginning with block 200. Thus, the program has examined a file that has a block allocation including blocks 200–224.

The examined file data 254 is also implemented in any of a number of suitable ways. For example, when the program 250 examines a file on the storage media volume, the program 250 stores data in the control information 216 that tags the file as examined. Such information can, for example, be stored in the user implementation area 234 in the control information 216 (FIG. 3).

The examined file data is also implemented as data identifying the control information 216 for each examined file. As previously described, the control information for each set of file data is stored on one or more blocks on the storage media 208. The examined file data may include data that identifies the one or more block numbers on which the control information is stored.

Another method used to implement the examined file data by using existing memory structures. For example, in the case of the NTFS file system, the operating system creates a stream control block (SCB) in memory for each accessed file. Typically, the SCB is only maintained while the file is accessed. However, in one embodiment, the program 252 keeps all SCBs open for all files accessed on a volume until the mount session for that volume ends. Thus, any file that has a corresponding SCB has already been examined by the program 250. Other similar memory structures are available for other file systems such as UDF. These structures are well known and need not be described further herein.

Alternatively, the secondary map 252 and examined files data 254 comprise a single set of data as shown, for example, in Table 2.

TABLE 2

| Starting Block | Length | File Identifier |
|---|---|---|
| 50 | 100 | 5000 |
| 200 | 5 | 5000 |
| 25 | 10 | 6000 |
| 100 | 100 | 6300 |

The data includes a series of entries. Each entry comprises a "Starting Block," a corresponding "Length" and a "File Identifier." The "Starting Block" and "Length" define a set of contiguous blocks allocated to the file. For example, the first entry includes a starting block of 50 and a length of 100. Thus, blocks 50 through 149 are allocated to at least one file. The "File Identifier" identifies files previously examined by program 250 during the current mount session by including data unique to the file. In the example, the file identifier is a block number of a block including control information 216 for the file having the corresponding blocks, as defined by the starting block and length, allocated to it. For example, the first entry includes a file identifier of 5000. Thus, the file having an allocation including blocks 50 through 149 has corresponding control information at block 5000 on the storage media 208.

As illustrated in Table 1, a file may have more than one data entry. For example, the first two entries in the table both have control information 216 at block 5000. Thus, the first two entries have the same control information 216 and the blocks identified as allocated by the first two entries are part of the same file.

Figure 5:
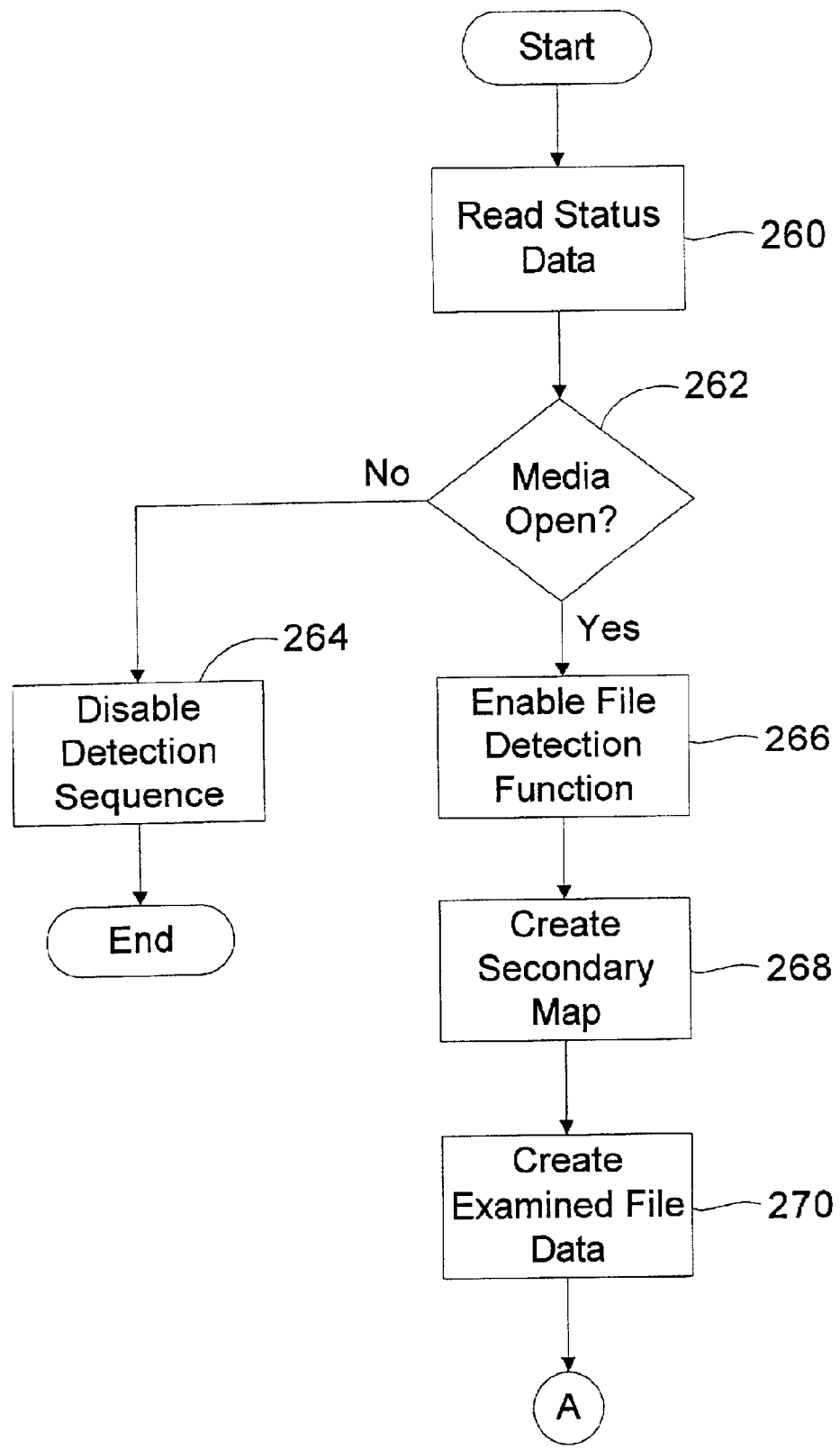
FIG. 5 is a flow chart illustrating an example of the procedure that may be followed in an embodiment of the invention.

FIG. 5 and FIG. 6 illustrate an exemplary method that program 250 uses to detect and correct cross-linked files on the storage media volume 210.

When a new volume of storage media 210 is first accessed during a mount session, for example after the computer is turned on or after a new storage media 210 is inserted into the storage device 208, the program 250 reads the status data 220 as shown in step 260. The program 250 then determines if the status of the storage media 210 is open or closed as shown at step 262. If the status data 220 indicates that the storage media 210 status is "closed" all previous write transactions associated with the storage media 210 were completed and the cross-linked file detection function is disabled as shown at step 264.

If the status data 220 indicates that the storage media 210 is "open" one or more pending write transactions may not have been completed during a previous mount session for that particular volume of storage media 210. As a result, the storage media 210 may be corrupted. For example, one or more cross-linked files may be present on the storage media 210 or an inconsistency may exist between the free space map 218 and the control information 216 for one or more files. When the status data 220 indicates that the storage media is open, a cross-linked file detection mode of file access is enabled as shown in step 266.

As shown in step 268, after the cross-linked file detection function is enabled, the secondary map 222 is created. The secondary map 222 is initialized to identify each block on the storage media 210 as unallocated. For example, if the secondary map is implemented as a bitmap, each bit in the bitmap is initially set to a value of 0.

In step 270, the examined file data 254 is created. As previously described, the examined file data 254 identifies files on the storage media previously examined by the program 250 during the current mount session.

FIG. 6 illustrates the cross-linked file detection function, labeled 278. The function 278 is carried out each time file data 214 on the storage media 210 is accessed. At step 280, the program 250 intercepts a request, for example from an application, to access the file data 214 on the storage media 210. The request is, for example, a request to read data from, or write data to, the storage media 210.

The program 250 compares the file containing the file data to be accessed with the examined file data 254 to determine whether that file has been previously examined by the program 250 during the current mount session as shown at step 282. If the file has been examined, the access request is processed by the operating system 202 and the sequence 280 terminates until another access request for the storage media volume is received, and the process begins again at step 280.

If the file has not previously been examined, the program 250 reads the control information 216 corresponding to the file data 214 to identify the blocks allocated to the file as shown at step 284. The blocks allocated to the file are then compared to the free space map 218. The program 250 then determines if any blocks allocated to the file are identified as unallocated in the free space map 218 as shown in step 286. If any blocks allocated to the file are marked unallocated in the free space map, the free space map 218 and control information 216 are reconciled as shown in step 288. An exemplary process for reconciling the free space map 218 and control information 216 is described in more detail below Reconciling the control information 216 of the file and the free space map 218 prevents additional files on the storage media 210 from becoming cross-linked.

After the free space map 218 and control information 216 are reconciled, the program 250 proceeds to step 290. During step 290, the program 250 compares the secondary map 252 to the blocks allocated to the file, i.e. the blocks identified in the control information for the file. At step 292, the program 250 determines if the file being examined is cross-linked with any previously examined file. If the program 250 determines that all of the blocks allocated to the file are identified as unallocated in the secondary map, the existence of cross-linked files is not detected (based upon the information currently available). The program 250 updates the secondary map to identify the blocks allocated to the file as allocated in the secondary map. For example, if the secondary map is implemented as a bitmap, each bit corresponding to an allocated block is set to a value of "1."

If the program 250 determines, during step 292, that one or more blocks allocated to the file are identified in the secondary map 252 as allocated, then at least two cross-linked files are known to exist since at least one other file has also identified the one or more blocks in its control information. The program 250 reconciles the secondary map 252 and the blocks allocated to the file as shown in step 296. An exemplary method for reconciling the blocks allocated to the file 216 and the secondary map 252 is described in more detail below. After the blocks allocated to the file and the secondary map 252 are reconciled, the secondary map is updated as shown in step 294 as previously described. Specifically, the secondary map is updated to identify, as allocated, the blocks allocated to the file.

The program 250 next determines whether all files on the storage media volume have been examined as shown in step 298. If all files have not been examined, the program 250 waits for the next access request and when the next access request is received, the program begins the process again at step 280.

If, at step 298, the program 250 determines that all files on the volume have been examined, the detection function 280 ends. As previously described, the process shown in FIG. 5 begins when a new volume is accessed. Optionally, before terminating, the program 250 replaces the free space map 218 on the storage media with the secondary map 252. Replacing the free space map 218 on the storage media frees any orphaned blocks. An orphaned block is a block that is identified in the free space map as allocated, but no file on the storage media has the block allocated to it.

Exemplary methods for reconciling the blocks allocated to the file and either the free space map 218 or the secondary map 252 will now be described. In one embodiment of the invention, when the program 250 reconciles the blocks allocated to the file and the free space map 218 as shown in step 288 (FIG. 6), the program 250 truncates the blocks in the control information 216 of the file so that it does not identify any blocks identified in the primary map as unallocated. By way of example, assume that the control information for the file identifies blocks 100–149, but the primary map identifies blocks 140–149 as unallocated. The program 250 truncates the control information 216 so that it identifies only blocks 100–139 as including data for the file.

A similar method is used to reconcile the blocks allocated to the file and the secondary map 252, as shown in step 296 For example, assume that the control information 216 for a first file identifies blocks 100–149 as allocated to the file. However, the secondary map 252 identifies blocks 100–125 as allocated meaning that a previously examined second file on the storage media volume includes control information that identifies blocks 100–125 as allocated to the second examined file. The program truncates the control information for the first file to only identify blocks 126–149.

As described with reference to FIG. 2, the allocation of a file 236 may comprise a series of entries and each entry may define a set of contiguous blocks allocated to the file. The program 250 only truncates the entries that conflict with the free space map 218 or the secondary map 252.

In another embodiment of the invention, the program 250 reconciles the blocks allocated to the file and either the free space map 218 or the secondary map 252 by moving file data to a new set of blocks. When the program 250 identifies blocks allocated to a file but that are marked unallocated in the free space map 218, the program 250 copies the data in the blocks identified by the free space map as unallocated to a new set of blocks. The program 250 then modifies the control information 216 so that it references the new set of blocks and modifies the primary map to identify the new set of blocks as allocated. For example, assume that the control information 216 for a first file identifies blocks 100–149 as including data for the first file, but the free space map identifies blocks 145–149 as unallocated. The free space map also identifies blocks 160–164 as unallocated. The program 250 copies the data from blocks 145–149 and stores the data in blocks 160–164. The program then modifies the control information 216 for the first file to identify blocks 100–144 and 160–164 and removes blocks 145–149 from the file's allocation. The program 250 then updates the free space map 218 to identify blocks 160–164 as allocated.

A similar method is used to reconcile the blocks identified in the control information 216 for a file and the secondary map 252. For example, assume that the control information 216 for a first file identifies blocks 100–149 as allocated to the file but that the secondary map identifies blocks 100–125 as also allocated to at least a second file. Assume also that the primary map identifies blocks 200–225 as unallocated. The program 250 copies the data from blocks 100–125 and stores the data in blocks 200–225 and modifies the first file's control information to identify blocks 126–149 and 200–225 while removing blocks 100–125. The primary map is also updated to now identify blocks 200–225 as allocated.

All of the references cited herein, including are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of detecting cross-linked files on a mountable storage media comprising a plurality of blocks, the storage media including at least a first file and a second file and a free space map, wherein each of the first file and second file comprise an allocation of one or more of the plurality of blocks, and wherein the free space map identifies each of the plurality of blocks on the storage media is allocated to at least one file or unallocated, comprising:

first reading, in response to a first request to access data on the storage media, allocation of the first file, wherein the allocation of the first file designates one or more of the plurality of blocks including data for the first file;

creating a secondary map for identifying blocks on the storage media determined to be allocated to one or more previously accessed files and updating the secondary map to identify the one or more of the plurality of blocks including data for the first file, wherein the secondary map comprises a plurality of bits forming a bitmap; each of the bits in the bitmap corresponding to one of the plurality of blocks on the storage media;

second reading, in response to a second request, after the first reading step, allocation of the second file, wherein the allocation of the second file designates one or more of the plurality of blocks including data for the second file;

reconciling the allocation of the second file with the free space map;

comparing the allocation of the second file with the secondary map to determine whether the allocation of the first file and the second file include at least one common block; and reconciling the allocation of the second file with the a location of the first file.

2. A method as in claim 1, further comprising the steps of:
comparing the allocation of the second file to the free space map.

3. A method as in claim 2, wherein the step of reconciling the allocation of the second file with the free space map comprises:

modifying the allocation of the second file such that the allocation of the second file only includes blocks designated in the free space map as allocated.

4. A method as in claim 2, wherein the step of reconciling the allocation of the second file with the free space map comprises:

copying data stored on the blocks that are designated unallocated in the free space map and included in the allocation of the second file to a new set of blocks on the storage media;

modifying the allocation of the second file to include the new set of blocks; and modifying the free space map to designate the new set of blocks as allocated.

5. A method as in claim 1, further comprising the step of:
detecting existence of at least one common block and wherein the step of reconciling the allocation of the second file with the allocation of the first file comprises:

removing, from the allocation of the second file, in response to the detecting step, the at least one common block.

6. A method as in claim 2 wherein the step of reconciling the allocation of the second file with the allocation of the file comprises:

copying data stored on the at least one common block, which is allocated to both the first file and the second file, to a new set of blocks; wherein the new set of blocks are designated in the free space map as unallocated;

modifying the allocation of the second file to include the new set of blocks;

removing, from the allocation of the second file, the at least one common block;

modifying the free space map such that the new set of blocks are designated as allocated.

7. A method as in claim 2, wherein the free space map comprises a bitmap on the storage media, the bitmap including a plurality of bits, each bit corresponding to one of the plurality of blocks on the storage media.

8. A method as in claim 7, wherein the bits in the bit map are set to either a first value or a second value, the first value corresponding to an allocated block and the second value corresponding to an unallocated block.

9. A method as in claim 1, further comprising:
identifying the second file as examined in a set of examined file data.

10. A method as in claim 9 wherein the second file further comprises control information and wherein the second file is identified as examined by storing data in the control information of the second file.

11. A method as in claim 1, further comprising replacing the free space map with the secondary map to remove blocks that are incorrectly identified as allocated.

12. A method for detecting cross linked files on a storage media, the storage media storing data for at least a first file, comprising:

mounting the storage media;

receiving a first access request for the first file subsequent to the mounting step and in response:

comparing allocation of the first file to a free space map, wherein the free space map identifies a set of unallocated blocks and a set of allocated blocks on the storage media;

comparing allocation of the first file to a secondary map, wherein the secondary map is used to identify allocated blocks based upon a set of previously examined files, wherein the secondary map comprises a plurality of bits forming a bitmap; each of the bits in the bitmap corresponding to one of a plurality of blocks on the storage media;

detecting that the first file and at least one of the previously examined files includes an allocation of at least one common block; and updating the secondary map to specify as allocated, a set of blocks corresponding to the allocation of the first file.

13. A method as in claim 12, further comprising:

in response to the step of comparing the allocation of the first file to the free space map; modifying the allocation of the first file such that the location of the first file only includes one or more of the set of blocks identified as allocated in the free space map.

14. A method as in claim 12, further comprising:

in response to the step of comparing the allocation of the first file to the free space map, copying data from one or more blocks identified by the allocation of the first file and also identified as unallocated by the free space map to a new set of blocks;

modifying the allocation of the first file to include the new set of blocks.

15. A method as in claim 12, further comprising:

receiving a second access request for a second file subsequent to the mounting step and subsequent to receiving the first access request, and in response:

comparing allocation of the second file to the free space map;

comparing allocation of the second file to the secondary map;

determining that the allocation of the second file includes at least one block specified by the secondary map as allocated.

16. A method as in claim 15, further comprising:

removing, from the allocation of the second file, the at least one block specified by the secondary map as allocated.

17. A method as in claim 15, further comprising:

copying data stored in the at least one block specified by the secondary map as allocated to a new set of blocks;

removing from the allocation of the second file, the at least one block;

modifying the allocation of the second file to include the new set of blocks.

18. A method as in claim 12, further comprising replacing the free space map with the secondary map to remove blocks that are incorrectly identified as allocated.

19. A computer-readable medium having computer computer-executable components for detecting cross-linked files on a storage media comprising a plurality of file including a first file comprising:

allocation of the first file;

an examined file data set for identifying previously examined files;

a free space map for identifying whether each of a plurality of blocks on the storage media is allocated to at least one file or unallocated;

a secondary map, wherein the secondary map identifies an allocation of the previously examined files, wherein the secondary map comprises a plurality of bits forming a bitmap; each of the bits in the bitmap corresponding to one of the plurality of blocks on the storage media; and a file detection function for detecting, in response to request to access the first file, that the first file and at least one of the previously examined files include an allocation of at least one common block by comparing the allocation of the first file to the secondary map.

20. A computer-readable medium as in claim 19, wherein the secondary map comprises a plurality of entries, each entry comprising a starting block and length defining a set of contiguous blocks defining at least portion of the allocation of the at least one examined file.

21. A computer-readable medium as in claim 19, wherein each file includes control information and the examined file data set or identifying the at least one examined file is stored in the control information.

22. A computer-readable medium as in claim 19, wherein each of the plurality of files comprise a unique identifier and wherein the examined file data set comprises the unique identifier for the at least one examined file.

23. A computer-readable medium as in claim 22, wherein the unique identifier corresponds to a block containing control information for the at least one examined file.

* * * * *